Jan. 18, 1966  C. W. HILL  3,229,547
TRANSMISSION CONVERSION UNIT FOR GEAR SHIFT LEVERS
Filed Oct. 31, 1960
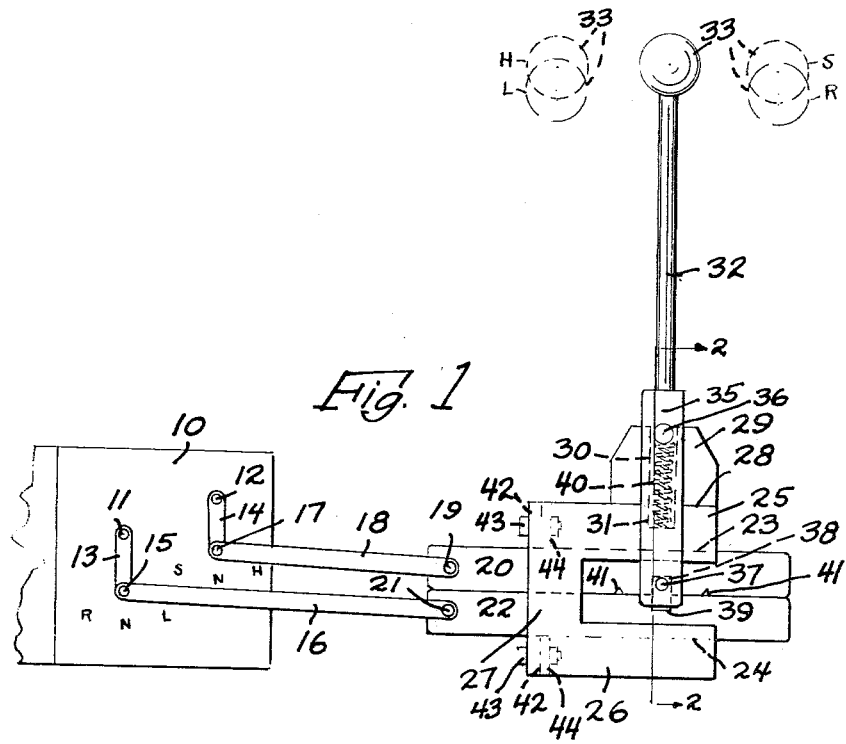
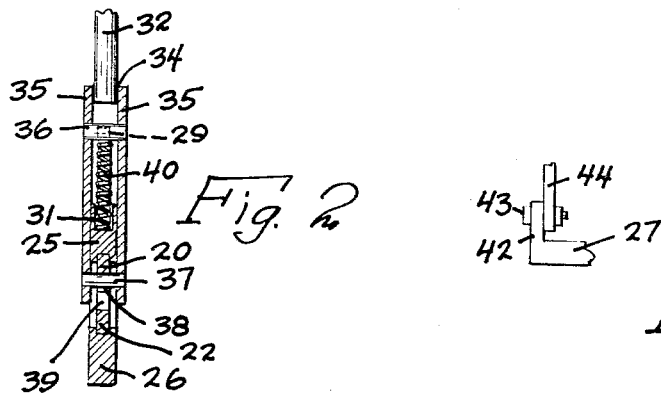
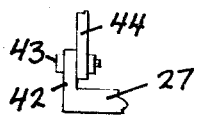
INVENTOR.
Curtis W. Hill
BY
Sam J. Slotsky
ATTORNEY ододо
United States Patent Office 3,229,547
Patented Jan. 18, 1966

3,229,547
TRANSMISSION CONVERSION UNIT FOR
GEAR SHIFT LEVERS
Curtis W. Hill, Rte. 1, Sioux City, Iowa
Filed Oct. 31, 1960, Ser. No. 66,138
2 Claims. (Cl. 74—473)

My invention pertains to a transmission conversion unit.

An object of my invention is to provide a transmission unit for automobiles in which the gear shifting portion of the unit is provided to readily change the standard type of shifting to a shifting arrangement which is much quicker in operation, which is simple to construct, and which renders it relatively easy for the operator to shift from a lower gear to a higher gear in a minimum of time, and without requiring any lateral movement of the gear shift whatsoever.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation showing my unit as it will operate a standard transmission arrangement, FIGURE 2 is a sectional view taken generally along the lines 2—2 of FIGURE 1, and FIGURE 3 is a detail.

My invention contemplates the provision of a gear shift lever arrangement which can be used to operate a standard transmission on an automobile without requiring lateral movement of any kind of the gear shift lever, thereby rendering the operation of shifting in certain types of automobiles very convenient and rapid.

I have used the character 10 to designate a standard transmission casing, and passing within the casing to the suitable gear arrangements therein are the shafts or pins 11 and 12 which are operated by means of the respective levers 13 and 14, the lever 13 being adapted to control the vehicle for reverse, neutral or low, the lever 14 being adapted to control the vehicle for second speed, neutral or high.

Pivotally attached to the lever 13 at 15 is a link 16, and pivotally attached at 17 to the lever 14 is a link 18, these links which I provide to work cooperatively with the shifting structure about to be described, it being understood that rods or other devices could be used instead of these links.

Pivotally attached at 19 to the link 18 is a vertically positioned strap 20, and pivotally attached to the link 16 at 21 is a further vertically positioned strap 22, the straps 20 and 22 being slidable with respect to each other, the upper strap 20 being received within a recessed longitudinal cavity 23, the lower strap 22 being received within the longitudinal recessed cavity 24, these cavities being provided in the horizontal portions 25 and 26 of a substantially U-shaped bracket having the vertical portion 27.

Attached to the upper portion 25 at 28 is a vertically positioned member 29 which includes the slot 30 therein, and merging with the slot 30 is a circular opening 31 which is provided in the upper portion 25.

The character 32 indicates a gear shift lever terminating in the knob 33, the lever 32 being suitably welded or otherwise attached at 34 to and between the pair of spaced arms 35, and attached between the arms 35 is a transverse pin 36 which is received within the slot 30. A further lower pin 37 is also attached between the arms 35, the pin 37 being received within an upper cavity 38 provided in the upper strap 20, the character 39 indicating a lower cavity which is provided in the upper edge of the strap 22.

The character 40 indicates a compression spring received in the opening 31 and within the slot 30, and which spring bears against the upper pin 36. The character 41 indicates V-shaped cavities spaced equally from the lower pin 37, these cavities being provided in the lower edge of the strap 20.

The character 42 indicates portions extending substantially at right angles from the U-shaped member portion 27, the character 43 indicating bolts passing therethrough, which bolts are also attached to suitable straps 44 which are attached to any convenient portion of the transmission, this arrangement thereby providing a support for the gear shift device.

The device is operated in the following manner. Assuming that the device is in neutral position, or the position shown in FIGURE 1, when it is desired to place the vehicle in reverse gear, the lever 32 is forced directly downwardly, which causes the pin 37 to enter into the lower cavity 39, and next, the lever is pulled to the right as viewed in FIGURE 1, whereby the knob 33 will occupy the R position, and whereby the strap 22 will be forced toward the left as viewed in FIGURE 1, which will correspondingly force the lever 13 toward the left and will thereby place the vehicle transmission in the reverse condition as shown.

Next, if it is desired to then place the vehicle in the low gear position, the lever 32 is still kept in its downward position, and the knob 33 is thrust to the left to the L position, as shown in FIGURE 1, which correspondingly forces the strap 22 toward the right as viewed in FIGURE 1, which then places the lever 13 into the low gear position.

The purpose of the cavities 41 is to convert the upward pressure of the spring 40 into a holding force, to aid the transmission in its function of keeping the low and reverse positions engaged, since by this means the spring 40 will not have the tendency of pulling the shift lever 32 into neutral position.

Next, to shift into second gear or S, the lever 32 is allowed to rise by spring action to the upper position shown in FIGURE 1, and the knob 33 is then thrust towards the right, whereby the action of the pin in the upper cavity 38 will cause the upper strap 20 to be forced to the left as shown in FIGURE 1, thereby correspondingly forcing the lever 14 to the left into S gear. Next, to shift into H or high gear, the knob 33 is thrust to the left as viewed in FIGURE 1, with the lever 32 being in its upper position, whereby the strap 20 will be forced toward the right, thereby carrying the lever 14 to the high or H position.

It will thereby be noted as a result of this action that the driver, and especially in the cases of those cars where a quick action is desired, will not find it necessary to shift into the cumbersome arrangement wherein lateral movements are required since the shifting to the various gears will be provided with only a forward and rearward movement of the shift lever, thereby providing a shift through the entire range of gears with quick forward and reverse motions, which allows the operator to get to a maximum speed in a minimum of time.

It will now be seen that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A transmission conversion unit for gear shift levers comprising an upper strap and a lower strap, a framework with which said straps are slidably engaged, means for moving said straps longitudinally with respect to each other, means for connecting said straps to a transmission unit, said upper strap having a lower cavity, said lower strap having an upper cavity, a shift lever engaged with said framework, said shift lever including a transverse pin attached thereto adapted to be engaged in either of said cavities, said shift lever including a further transverse upper pin, a spring positioned between said further transverse upper pin and a portion of said framework, whereby said lever will be forced upwardly to carry said transverse pin upwardly when downward pressure on said lever is released, said upper strap having a pair of longitudinally spaced lower cavities for receiving upper portions of said transverse pin during conditions when said lever is in lower engaged position.

2. A shifting mechanism for actuating mechanism for selecting gear ratios or speed ranges of a transmission wherein there are at least three engaged positions to be occupied in sequence and only two selection members therefor, each selection member having two extreme positions corresponding to selected gear ratios or speed ranges, comprising a pair of slides juxtaposed to and reciprocable forwardly and rearwardly along one another to their respective extreme positions, each slide having a recess in the face thereof adjacent the recessed face of the other slide, the recesses being juxtaposed to one another when the slides are in an intermediate position, a selector pin reciprocable forwardly and rearwardly and reciprocable also perpendicularly to the adjacent recessed faces of the slides and adapted to engage the recesses in the respective slides and thereby move them separately to and from each extreme position, successive selection of two of the three positions to be occupied in sequence requiring a single forward to rearward movement of the selector pin and also a single perpendicular movement thereof, whereby the selector pin must be disengaged from the recess in one slide and be engaged in the recess in the other slide in proceeding in the proper order from one to the other of those two of the sequential positions.

References Cited by the Examiner

UNITED STATES PATENTS

| | | | |
|---|---|---|---|
| 2,178,177 | 10/1939 | Lasley | 74—473 |
| 2,554,312 | 5/1951 | Price | 74—474 |
| 2,812,667 | 11/1957 | Renaud | 74—334 |
| 2,961,890 | 11/1960 | Marshall | 74—473 |
| 3,057,222 | 10/1962 | Almquist | 74—335 |

DON A. WAITE, *Primary Examiner.*

BROUGHTON G. DURHAM, *Examiner.*